United States Patent [19]

McIntire et al.

[11] 4,291,131

[45] Sep. 22, 1981

[54] PLASTIC NOZZLES OF MOLDABLE POLYETHYLENE AND POLYPROPYLENE POLYMERS HAVING ORGANIC ACIDS DISPERSED THEREIN

[75] Inventors: John M. McIntire; Richard H. Blair, both of Kingsport, Tenn.

[73] Assignee: Permabond International Corp., Englewood, N.J.

[21] Appl. No.: 101,661

[22] Filed: Dec. 10, 1979

[51] Int. Cl.³ .............................................. C08F 8/46
[52] U.S. Cl. ...................................... 525/5; 222/566; 525/386
[58] Field of Search .................................... 525/5, 386

[56] References Cited

U.S. PATENT DOCUMENTS

| | | | |
|---|---|---|---|
| 3,207,736 | 9/1965 | Wijga | 525/5 |
| 3,639,376 | 2/1972 | DePierri et al. | 525/5 |
| 3,804,926 | 4/1974 | Schwarz et al. | 525/5 |

Primary Examiner—John Kight, III

[57] ABSTRACT

A nozzle for use on containers for holding cyanoacrylate adhesives and comprised of moldable materials having an organic acid dispersed therein for inhibiting the polymerization of the adhesives within the nozzle.

7 Claims, No Drawings

PLASTIC NOZZLES OF MOLDABLE POLYETHYLENE AND POLYPROPYLENE POLYMERS HAVING ORGANIC ACIDS DISPERSED THEREIN

BACKGROUND OF THE INVENTION

The present invention is directed to an improved plastic nozzle for use on containers containing cyanoacrylate adhesives or similar type acting adhesives, the improved nozzle being capable of inhibiting the premature polymerization of the adhesives within the nozzle after the container has been opened for use.

After the user opens for use a tube or bottle or other type of container storing cyanoacrylate or similar type adhesive therein, he may find that the next time he or she wants to apply such adhesive from the container that the adhesive has undesirably hardened or polymerized within the tapered nose-like nozzle from which the adhesive is usually dispensed from the container. In other words, a polymerized adhesive plug may have formed in the tip of the plastic nozzle. This polymerization of the cyanoacrylate adhesive after the container has been opened can occur as quickly as a few days, depending upon environmental conditions.

A cyanoacrylate adhesive or similar type adhesive is formulated from monomers which rapidly polymerize in the presence of mildly basic substances. In bonding situations, it is theorized that traces of water on the surface of the substrates are sufficiently basic to initiate the fast adhesive action. Since nearly all substances have traces of water on their surfaces, it would seem that packaging these adhesives would be nearly impossible. This, however, is not the case because of two factors. First, some care is taken to dry the containers prior to filling. Second, there is a high adhesive volume-to-surface ratio in the container which significantly reduces the probability of surface initiation of polymerization. These factors, however, are not present in the narrow opening of the tapered nose-like nozzle after adhesive has once been dispensed from the nozzle. Surface energetics often prevent all of the adhesive from draining back into the container after use. This leaves a small amount of adhesive in the narrow tip of the nozzle. This nozzle, most likely, has been exposed to moisture (humidity) and thus traces of water are present on its surface. Also the volume-to-surface ratio is greatly reduced in the confines of this narrow tip, approaching, therefore, the conditions encountered in bonding situations. Thus it is not surprising that this adhesive residue often polymerizes in the nozzle tip, preventing further use of the remaining adhesive in the container.

An objective, therefore, of the invention is to provide an improved plastic nozzle that will prevent or inhibit the cyanoacrylate adhesive or similar type acting adhesive from polymerizing in the nozzles of tube and bottle containers so that the user may continue to dispense from these containers until the adhesive is consumed. In many user applications, this may require several months to a year to use all of the adhesive.

The Colvin et al patent, U.S. Pat. No. 3,523,628, assigned to Loctite Corporation, discloses a container for cyanoacrylate ester adhesives said to be designed to minimize deterioration of contents and afford long shelf life stability. The adhesive dispensing surfaces of the container are formed of a thermoplastic resin having low surface-free energy serving to inhibit the cyanoacrylate ester against undergoing significant polymerization on or about the dispensing surfaces during or following dispensing of the adhesive under normal conditions of use. The patentees explain that the precise mechanism of physical chemistry which produces this result is quite complicated and difficult to fully explain. They offer the explanation that it appears that the cyanoacrylate adhesive resins are acutely sensitive materials and are liable to activation in the presence of high surface energy materials. The upper limit of the quantum of surface-free energy that was found permissible for purposes of their invention, therefore, is about 35 dynes per centimeter, and preferably somewhat less than that value or about 30 dynes per centimeter. Surface-free energy is described by them as being a physical property of solids as well as liquids and is related in at least some manner with critical surface tension. Reference is made by them to a discussion appearing in Swartz, Perry and Berch, Surface Active Agents and Detergents, Vol II, 1958, Interscience Publishers, New York, N.Y. and to the sources identified therein.

Thus part of the disclosure of the Colvin et al patent relates to a dispensing surface that will inhibit premature polymerization of cyanoacrylate adhesives in or on the dispensing surface by a physical mechanism or phenomenon identified as surface-free energy, the surface-free energy of the dispensing surface being about 30 to about 35 dynes per centimeter.

In an earlier published book, "Adhesion and Adhesives", edited by R. Houwink and G. Salomon, Second Completely Revised Edition (1965), Vol 1, Elsevier Publishing Company (Amsterdam, London, New York), it is noted that polyethylene, for instance, is shown to have a surface-free energy of about 31 dynes per centimeter (see page 42).

It is, therefore, another objective of the invention to provide an improved plastic nozzle through which cyanoacrylate adhesives may be dispensed, the surface of the nozzle relying upon a chemical mechanism or phenomenon rather than a physical one as disclosed in the Colvin et al patent for inhibiting the cyanoacrylate adhesive against undergoing significant polymerization on or about the dispensing surfaces of the nozzle. For instance, this chemical solution to the premature inhibition problem, as applied to polyethylene, for instance, would increase significantly the surface-free energy of a surface made of polyethylene, which thus would go against the teaching of the Colvin et al patent.

SUMMARY OF THE INVENTION

We have observed that an acidic surface inhibits the polymerization of cyanoacrylate adhesives. For example, woods which possess an acid surface retard the fast-setting action of these adhesives for several minutes. This observation has led us to discover that by building an acidic surface into the plastic nozzle, polymerization of the adhesive can be prevented for a prolonged period of time. Specifically we have discovered that the use of an organic acid dispersed in moldable materials selected from polyethylene having a melt index at 190° C. of about 1 to about 50 and a density of about 0.90 to about 0.98, polypropylene and crystallizable copolymers of polypropylene containing up to about 10% ethylene and each having a melt flow index at 230° C. of about 2 to about 30, serves to inhibit the polymerization of cyanoacrylate adhesives within nozzles made from such materials.

The organic acid may be selected from di-, tri- and tetracarboxylic acids having a melting point above 100° C. and may comprise about 0.01% to about 0.5% by weight of the moldable material; and preferably about 0.2%.

For instance, the organic acid may be selected from citric acid, tartaric acid, maleic acid and fumaric acid.

The polyethylene moldable material may preferably have a melt index at 190° C. of about 10 to about 40; and the polypropylene and crystallizable copolymer of polypropylene moldable materials may preferably each have a melt flow index at 230° C. of about 4 to about 20.

DESCRIPTION OF THE PREFERRED EMBODIMENT

In reference to Tables 1 and 2, the effect of polyethylene (PE) nozzles, for instance, containing 0.2% of an organic acid such as citric acid (CA) on the stability of a cyanoacrylate adhesive is compared with the effects of a 30 melt index polyethylene (PE) nozzle and of a polypropylene (PP) nozzle which do not have an organic acid dispersed within the moldable materials making up the two different types of nozzles. This work was performed to determine if the addition of citric acid (CA), for instance, would prolong the stability of the cyanoacrylate adhesive in the nozzle. Tin tubes were filled with adhesive, opened in the regular manner by puncturing the seal at the top of each of the tin tubes, and capped with each of the three types of nozzles. The tubes were placed in a 50° C. oven in either a sideways or an upright position.

The results shown in Table 1 show that the polyethylene (PE) nozzle containing citric acid (CA) prolongs the stability of the adhesive in the nozzle. The position of the tube has little influence on the stability.

In another experiment the tips of the three different nozzles were sealed and adhesive was placed into the inverted nozzle. Storage in a 50° C. oven showed that the adhesive in the polyethylene (PE) nozzles containing 0.2% citric acid (CA) remained unpolymerized substantially longer than the adhesive in the polypropylene nozzles (see Table 2).

TABLE 1

Effect of Polyethylene Nozzles Containing 0.2% Citric Acid on the Stability of Cyanoacrylate Adhesive

| | Number Out of Four That Dispense | | | | | |
|---|---|---|---|---|---|---|
| | Upright | | | Sideways | | |
| Days in 50° C. Oven | 0.2% Citric Acid PE Nozzle | 30 Melt PE Nozzle | Polypropylene Nozzle | 0.2% Citric Acid PE Nozzle | 30 Melt PE Nozzle | Polypropylene Nozzle |
| 1 | 4 | 3 | 1 | 4 | 4 | 3 |
| 3 | 4 | 3 | 0 | 4 | 4 | 0 |
| 10 | 3 | 2 | 0 | 4 | 4 | 0 |
| 24 | 3 | 2 | 0 | 4 | 4 | 0 |
| 27 | 3 | 2 | 0 | 3 | 3 | 0 |
| 32 | 2 | 1 | 0 | 2 | 2 | 0 |
| 39 | 1 | 1 | 0 | 2 | 2 | 0 |
| 49 | 1 | 1 | 0 | 2 | 2 | 0 |
| 54 | 1 | 0 | 0 | 2 | 0 | 0 |
| 64 | 1 | 0 | 0 | 1 | 0 | 0 |
| 67 | 1 | 0 | 0 | 0 | 0 | 0 |
| 113 | 0 | 0 | 0 | 0 | 0 | 0 |

TABLE 2

Effect of Polyethylene Containing 0.2% Citric Acid on the Stability of Cyanoacrylate Adhesive

| | Number Out of Four That Remain Unpolymerized[1] | | |
|---|---|---|---|
| Days in 50° C. Oven | 0.2% Citric Acid PE Nozzle | 30 Melt PE Nozzle | Polypropylene Nozzle |
| 2 | 4 | 4 | 0 |
| 15 | 4 | 3 | 0 |
| 18 | 4 | 0 | 0 |
| 25 | 0 | 0 | 0 |

[1]The tips of the nozzles were sealed by melting the polyethylene or the polypropylene. The cyanoacrylate adhesive was dropped directly into each nozzle.

It is thus apparent that the addition of an organic acid such as citric acid prolongs the stability of the cyanoacrylate adhesive in the tube nozzle.

Other organic acids will also be effective so long as they are compatible with the particular plastic moldable material being used. for instance, the di-, tri- and tetracarboxylic acids having a melting point above 100° C. These organic acids must be compatible with compounding of plastics used for injection molding to make the nozzles. Specific examples of such compatible organic acids include tartaric acid, maleic acid and fumaric acid. The organic acid, therefore, should be a solid since a liquid acid at plastic extrusion temperatures or injection molding temperatures would probably boil, flash off and cause other problems such as corrosion of extrusion equipment.

The percentage of the organic acid to be dispersed in the moldable plastic materials is considered to range from about 0.01% to about 0.5%. More than 0.5% may leach out of the plastic nozzle, leading to inhibition of the cyanoacrylate polymerization action when attempting to bond surfaces.

The materials used for making plastic nozzles suitable for use with cyanoacrylate or similar type acting adhesives may include polyethylene having a melt index at 190° C. of about 1 to about 50 and preferably from about 10 to about 40; and polypropylene and crystallizable copolymers of polypropylene containing up to about 10% ethylene, each having a melt flow index at 230° C. of about 2 to about 30 and preferably from about 4 to about 20.

The extrusion and other processing equipment used to blend and extrude the organic acid-modified plastic material should be made of stainless steel in order to minimize possible corrosion problems.

This invention has been described in detail with particular reference to preferred embodiments thereof, but it will be understood that variations and modifications can be effected within the spirit and scope of the invention.

We claim:

1. A nozzle for use on containers for holding cyanocrylate adhesives, said nozzle being comprised of moldable materials selected from polyethylene, polypropylene and crystallizable copolymers of polypropylene containing up to about 10% ethylene, and having an organic acid selected from the group consisting of citric acid, maleic acid and fumaric acid dispersed in said moldable materials in an amount effective to provide an acidic surface for inhibiting the polymerization of said adhesves within said nozzle.

2. A nozzle as defined in claim 1, wherein said organic acid comprises about 0.01% to about 0.5% by weight of said moldable materials.

3. A nozzle as defined in claim 1, wherein said organic acid comprises about 0.01% by weight of said moldable materials.

4. A nozzle as defined in claim 1, wherein said organic acid comprises about 0.2% by weight of said moldable materials.

5. A nozzle as defined in claim 1, wherein said organic acid comprises about 0.3% by weight of said moldable materials.

6. A nozzle as defined in claim 1, wherein said organic acid comprises about 0.4% by weight of said moldable materials.

7. A nozzle as defined in claim 1, wherein said moldable material is polyethylene and said organic acid is citric acid comprising about 0.2% by weight of said moldable material.

* * * * *